United States Patent
Aaron, III et al.

(10) Patent No.: US 10,801,534 B2
(45) Date of Patent: Oct. 13, 2020

(54) MEDIUM INDEPENDENT PRESSURE TOLERANT RELEASE DEVICE, SYSTEM AND METHOD

(71) Applicant: The Regents of the University of California, Oakland, CA (US)

(72) Inventors: Ernest L. Aaron, III, Escondido, CA (US); Mark R. Gibaud, Alpine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 931 days.

(21) Appl. No.: 15/321,371

(22) PCT Filed: Jul. 6, 2015

(86) PCT No.: PCT/US2015/039221
§ 371 (c)(1),
(2) Date: Dec. 22, 2016

(87) PCT Pub. No.: WO2016/007442
PCT Pub. Date: Jan. 14, 2016

(65) Prior Publication Data
US 2017/0191511 A1 Jul. 6, 2017

Related U.S. Application Data

(60) Provisional application No. 62/021,364, filed on Jul. 7, 2014.

(51) Int. Cl.
*B63B 22/06* (2006.01)
*F16B 1/00* (2006.01)

(52) U.S. Cl.
CPC .............. *F16B 1/00* (2013.01); *B63B 22/06* (2013.01)

(58) Field of Classification Search
CPC ........ F16B 1/0014; E21B 41/10; E21B 33/13; E21B 33/138; B63B 21/60; B63B 21/66; B63B 22/06
See application file for complete search history.

(56) References Cited

U.S. PATENT DOCUMENTS 4,154,365 A 5/1979 Lorca
4,259,401 A 3/1981 Chahroudi et al.
(Continued)

FOREIGN PATENT DOCUMENTS

EP 0686553 A1 12/1995

OTHER PUBLICATIONS

Copenheaver, Blaine, R., et al., "Notification of Transmittal of the International Search Report and the Written Opinion of the International Searching Authority, or the Declaration", Patent Cooperation Treaty Application No. PCT/US2015/039221, United States Patent Office as Search Authority, dated Oct. 5, 2015, 9 pages.

(Continued)

*Primary Examiner* — Daniel J Wiley
(74) *Attorney, Agent, or Firm* — Greer, Burns & Crain, Ltd.; Steven P. Fallon (57) ABSTRACT

A release device for releasing another device in an environment includes a housing containing a material matrix. A member is restrained by the material matrix and extends outside the housing. The matrix is a solid in conditions of the environment to hold the member stationary in opposition to predetermined force. The matrix softens at a predetermined softening temperature to permit relative movement between the member and the material matrix. A heating element is disposed to heat the material matrix to the predetermined softening temperature. A method for releasing a device includes attaching the device to a member extending out of the release device. The device remains attached against the (Continued)

predetermined force. The matrix is heated to the softening temperature in response to a communication to permit movement of the member to fully or partially release the device.

12 Claims, 4 Drawing Sheets

(56) References Cited

U.S. PATENT DOCUMENTS

| | | | |
|---|---|---|---|
| 4,842,761 | A | 6/1989 | Rutherford |
| 5,184,328 | A | 2/1993 | Dumestre, III |
| 5,418,757 | A | 5/1995 | Rau et al. |
| 5,810,198 | A | 9/1998 | Townsend et al. |
| 7,179,407 | B2 | 2/2007 | Vaghefi et al. |
| 7,187,623 | B2 | 3/2007 | Green et al. |
| 2008/0187391 | A1* | 8/2008 | Mimken ............... F16B 1/0014 403/28 |
| 2010/0000116 | A1 | 1/2010 | Aouad et al. |
| 2010/0050905 | A1 | 3/2010 | Lewis et al. |
| 2011/0277343 | A1 | 11/2011 | Howe et al. |
| 2013/0126164 | A1 | 5/2013 | Sweatman et al. |
| 2017/0191511 | A1 | 7/2017 | Aaron, III et al. |

OTHER PUBLICATIONS

Hakanson et al., "An Automatic Release Instrument with Underwater Buoy for Marking of Field Equipment," Water Resources Research, vol. 12, No. 2, p. 309-12 (Apr. 1976).
Product Brochure for Edge Tech PORT MFE Push off Release Transponder, https://www.edgetech.com/products/acoustic-releases/port-mfe-push-off-release-transponder/#productTab4.
Product Brochure for Edge Tech PORT-LF Push off Release Transponder Law Frequency, https://www.edgetech.com/products/acoustic-releases/port-lf-push-off-release-transponder/#productTab4.
Product Brochure for Edge Tech BRT6000 NAB Burn Wire Activator/ Acoustic Transponder, https://www.edgetech.com/products/acoustic-releases/model-brt6000-burn-wire-activator/#productTab4.
Product Brochure for Edge Tech 8242XS Acoustic Release Transponder, https://www.edgetech.com/products/acoustic-releases/model-8242xs-acoustic-release-transponder/#productTab4.

* cited by examiner

MEDIUM INDEPENDENT PRESSURE TOLERANT RELEASE DEVICE, SYSTEM AND METHOD

PRIORITY CLAIM AND REFERENCE TO RELATED APPLICATION

The application claims priority under 35 U.S.C. § 119 and all applicable laws and treaties from prior U.S. provisional application Ser. No. 62/021,364, which was filed Jul. 7, 2014.

FIELD

A field of the invention is release devices. Example applications of the invention include deep and shallow salt and fresh water instruments. Release devices of the invention are medium independent and pressure tolerant, and can work in other environments, such as in air at ground level and altitude. Release devices of the invention can be utilized in many fields, including for example, underwater research, oil and gas exploration, military and security devices, and many other fields requiring the distant release of objects.

BACKGROUND

Release can include complete separation of two objects or a limited range of movement of two objects. Certain environments, for example deep water and high altitude, are especially challenging. Controlled release at a desired release time must be achieved, as well as prevention of release before that time. Remote distances must be overcome as well as harsh conditions, which can include high pressures.

Deep water and ocean floor investigation commonly uses a ballast weight to be dropped at a desired time to release a scientific instrument package that can then float back to the ocean surface for recovery. State of the art technology for achieving such release is referred to as a "burn wire", available from Edge Technology-ORE. A variety of shallow and deep water acoustic release devices are offered by this company. The "burn wire" is acoustically activated. The activation initiates a current into the wire, which shorts through the sea water to a ground rod nearby. As the burn-wire corrodes, it eventually snaps under the tension being provided by a spring loaded mechanical release which suspends the ballast weight. One drawback of this technology is that it only works in sea water (where the salt solution completes the electrical circuit allowing the wire to corrode). It is also a single use item that is not recycled, and is expensive at approximately $100 per unit. Another drawback is inconsistent release timing. The corrosion time of the burn wire is dependent upon a number of factors that make the time of release unpredictable, which can hinder the recovery of instrumentation at a desired time.

Other release mechanisms have relied upon timed explosions. For example, Hakanson et al., "An Automatic Release Instrument with Underwater Buoy for Marking of Field Equipment," Water Resources Research, Vol. 12, No. 2, p. 309-12 (April 1976), describes a release that uses a timed circuit to initiate detonation of gunpowder. This release mechanism can only be set for a predetermined time in advance, and can't be controlled from the surface like the acoustic burn wire devices. The use of a detonator and gunpowder implicates safety and regulatory concerns. Like the burn wire device, the release device with the explosive charge is not reusable. Finally, the explosive charge can damage or interfere with instrument readings of the instrument being released.

Green et al., U.S. Pat. No. 7,187,623 describes an underwater data communication and instrument release management system. The system includes two way modem communications and a mechanical release mechanism. The release mechanism is a motor driven screw and push rod that pivots a latch to release an instrument attached via the latch. Motors for this operation add complexity and can be unreliable in severe environments. The latch is also exposed to the environment and attached via tether. This can be fouled or hindered by surrounding environment, which can either interfere with or prevent latch movement or release of the tether, even if the latch operates.

Dumestre, III U.S. Pat. No. 5,184,328 describes an underwater release mechanism that uses an acoustic signal to melt a volume of wax or another material to a liquid state that occupies an expanded volume. The expansion actuates a cylinder to move a hook against the force of a spring, freeing a rope from the hook outside of the hosing. The cylinder is a complex mechanical movement. This relatively large device also requires significant power for heating to cause the solid to liquid transition necessary for expansion to create force to move the cylinder. The hook and rope outside the housing are subject to environmental interference that can hinder movement and release. Rau et al. U.S. Pat. No. 5,418,757 and Olivier EP 0 686 553 disclose variations of the Dumestre concept, also using a mechanical actuator that responds to the expansion of melting wax.

SUMMARY OF THE INVENTION

An embodiment of the invention is a release device for releasing another device in an environment and includes a housing containing a material matrix. A member is restrained by the material matrix and extends outside the housing. The matrix is a solid in conditions of the environment to hold the member stationary in opposition to predetermined force. The matrix softens at a predetermined softening temperature to permit relative movement between the member and the material matrix. A heating element is disposed to heat the material matrix to the predetermined softening temperature. A method for releasing a device includes attaching the device to a member extending out of the release device. The device remains attached against the predetermined force. The matrix is heated to the softening temperature in response to a communication to permit movement of the member to fully or partially release the device.

DETAILED DESCRIPTION OF THE PREFERRED EMBODIMENTS

The invention provides medium independent release devices that can provide reliable and controlled partial or full release in a wide variety of conditions, including harsh conditions in air, water and other media. The invention provides release devices that are capable, for example, of releasing instruments from deep and shallow salt and fresh water. Preferred devices are also re-usable. Unlike burn wire devices, the release device of the invention can be re-set, without the replacement or repair of any portions of the device. A release device of the invention does not require any explosive charge and does not depend upon surrounding medium to aid the release process, such as required by release devices that require a corrosive reaction in saltwater. Release devices of the invention don't require significant amounts of energy from a power source, and don't rely upon complex mechanical movements.

Release devices of the invention are medium independent and pressure tolerant, and can work in many benign and harsh environments, such as in air at ground level and altitude. Release devices of the invention can be utilized in many fields, including for example, underwater research, oil and gas exploration, military and security devices, and many other fields requiring the distant release of objects.

An embodiment of the invention is a release having a material matrix that restrains a member, and a heating element to heat the matrix to a softening temperature. The material matrix holds the member stationary in opposition to force when the matrix is below the softening temperature and permits movement of the member when heated to the softening temperature. A method of release holds a member against a force with a material matrix. The matrix is heated via a heating element to a softening temperature. At the softening temperature, the member is permitted to move relative to the material matrix. The softening can allow complete release, in which the member is allowed to separate from the material matrix.

Preferred release devices of the invention permit, for example, a weight drop to facilitate recovery of any instrument at the depth and in any medium for which the instrument is rated. Preferred release devices lack compressible parts or complex mechanical movements and can function properly at any depth (or altitude), and will work in freshwater, saltwater, in the air or in other challenging mediums. Preferred release devices are also re-usable. It is inexpensive to manufacture. It is scalable and can be configured to oppose significant forces to prevent release prior to the desired time of release.

A preferred release device is for releasing another device in an environment. The release device includes a housing containing a material matrix therein. A member is restrained by the material matrix and extends from the material matrix to outside the housing. The material matrix is a solid in conditions of the environment to hold the member stationary in opposition to predetermined force and softs at a predetermined softening temperature to permit relative movement between the member and the material matrix. A heating element is disposed to heat the material matrix to the predetermined softening temperature. The material matrix is preferably a polymorph material. The heating element is preferably a silicon heat strip.

The release device preferably includes a remote communication sensor to receive a communication to activate the heating element.

The release device preferably includes a power source for powering the heating element. The power source is preferably an integral part of the release device. The power source is preferably a battery.

The release device of a preferred embodiment includes a cap sealed to the housing. The cap contains a power source for powering the heating element and a controller for controlling the heating element and communications via a remote communication sensor. A preferred communication sensor is a sonar sensor.

The material matrix preferably is a re-usable matrix that reforms into a solid after being heated beyond the predetermined softening temperature and allowed to cool back below the predetermined softening temperature.

A preferred embodiment includes a mount to mount the release device to a mechanical release device.

A preferred release system includes a release device mounted to a mechanical release device. The mechanical release device includes a spring that provides the predetermined force to a pivot member that is attached to the member.

A preferred release device of the invention includes a cap attached to the housing. The member extends through the cap. The cap includes a spring that applies the predetermined force to the member.

Preferred release devices include a resistive heating element. Others include a chemical heating element.

A preferred release device is for releasing another device in an environment. The release devices includes a housing and a member configured to attach to the device outside of said housing and extend into said housing. A material matrix restrains the member in conditions of the environment to hold the member stationary in opposition to predetermined force and permit relative movement between the member and the material matrix at or above a predetermined temperature. The material matrix is controlled in response to a remote communication.

A preferred method for releasing a device in response to a remote communication received through an environment includes attaching the device to a member extending out of a release device, and holding the member with a material matrix under conditions of the environment to prevent release against an opposing force associated with the device. A remote communication is received through the environment. The method includes heating the material matrix in response to the remote communication to heat the matrix to a softening temperature and permit movement of the member to fully or partially release the device.

Preferred embodiments of the invention will now be discussed with respect to the drawings and with regard to experimental prototype devices. The drawings may include schematic representations, which will be understood by artisans in view of the general knowledge in the art and the description that follows. Features may be exaggerated in the drawings for emphasis, and features may not be to scale. Artisans will appreciate broader aspects of the invention from the experimental prototypes.

Figure 1A:
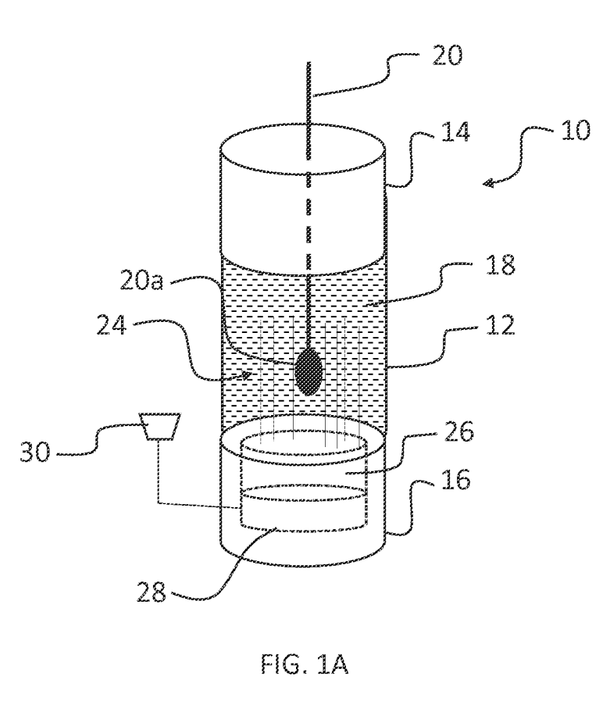
FIG. 1A is schematic diagram that shows a preferred embodiment release device of the invention.

FIG. 1A is a schematic diagram of a preferred embodiment release device 10 of the invention. The release includes a housing 12 that is closed with first and second end caps 14 and 16. The second end cap 16 is preferably sealed to protect components inside. The first end 14 cap is preferably not sealed, which allows equalization of pressure when the release device is submerged or put into another high pressure external environment. In other embodiments, the first end cap 14 is omitted. The device does not need to be closed or sealed at that end. The shape of the housing 12 and caps 14 and 16 is cylindrical, but other shapes can be used, with various cross-sections, e.g., triangular, square, rectangular, hexagonal, etc. cross-sections. The housing 12 contains a material matrix 18, which holds a member 20 stationary against a predetermined force. The predetermined force, for example, can be spring force provided by an external mechanical release mechanism. There is a direct interface with frictional forces between the matrix 18 and the member 20 providing all or a substantial majority, e.g., 90%, of the force to oppose the predetermined force. The member 20, such as a wire of metal, allow or other material that can tolerate and oppose the predetermined force extends into the material matrix 18 through the cap 14, preferably in a sealed fit to prevent liquids from entering the housing 12.

The member 20 include features to increase the amount of surface area that contacts the material matrix 18. For example, it can include flattened portions, fins or the like. An example oval shaped flat portion 20a is shown at the terminal end of the member 20 in FIG. 1A. It can also be shaped, such as with a hook at its end to prevent the member from exiting the cap 14. In other embodiments, the member 20 is a straight wire that is configured to pass through and out of the housing. With a straight wire, the terminal end in the material matrix 18 should include a rough portion, bumps, twisted portion or some other feature that enhances contact and friction between the member 20 and the material matrix. In other embodiments, multiple members 20 can be used. Multiple members 20 individually embedded in the material matrix 18 provide the ability to oppose more force than a single member 20.

Normally, the member 20 is held firmly by the material matrix 18. The matrix 18 is a solid under a range of temperatures for the environment of intended use of the release device, e.g., underwater or in upper atmosphere. The matrix 18 and member 20 oppose the predetermined force under these conditions.

Movement of the member 20 relative to the matrix 18 and the housing 12 is permitted when the material matrix 18 is heated to a predetermined softening temperature by heating elements 24 powered by a power source 26, which in preferred embodiments is a battery contained within the end cap 16. Example heating elements include resistive heating elements, e.g., silicon heat strips. Preferred heating elements are submersible, low power, pliable, and able to wrap around, within or be distributed throughout the material matrix 18 for an even heating of the material matrix. In other embodiments, the heating elements 24 are realized by a chemical heater that can be electrically initiated. A chemical heater is less preferred, as the release device 10 then cannot be readily reused. With the preferred electrical resistive heating elements, the heating element and release device 10 can be reused without replacing any parts. Also, with the preferred electrical heating element embodiments, the heating can be precisely controlled for a specific time period. This can allow achievement of a softening temperature in a predetermined range slightly above initial softening that only slightly reduces friction to allow specific limited movement of the member 20. The temperature can also be raised to a higher range above the predetermined softening temperature to allow, for example, the complete release of the member 20 outside of the housing 12 and cap 14. The duration and amplitude of heating can be controlled by a controller 28.

The second end cap 16 preferably includes environmentally resistant power wires connected to the heat strip terminals and is sealed in a pressure resistant encapsulate within the body of the second end cap 16.

Control of the heating is provided by the controller 28 that also provides a communication interface via a communication sensor 30 to receive remote communications from a device configured to communicate with the communication sensor 30 over a remote distance through an environment that the release device 10 is used in. The communication sensor 30 and communication interface can be, for example, any conventional sensor used in known release devices, including those discussed in the background of the application. A preferred type of sensor is an acoustic sensor, such as used in deep underwater release devices.

The member 20 connects outside the end cap 14 to a device to be released from the release device. An example device is a seismometer, ballast weight, samplers, recovery buoy, etc. In operation, portion of the member, e.g., a titanium wire, is held by the matrix 18 within the housing and will move to release an external device or actuate an external mechanism to release a device upon heating to a softening temperature. The cross-section and diameter of the wire, the length of the wire in the matrix 18, and the material characteristics of the matrix can be selected for a particular resistance to release and respond to a release signal in a controlled and predetermined manner and time period.

Figure 1B:
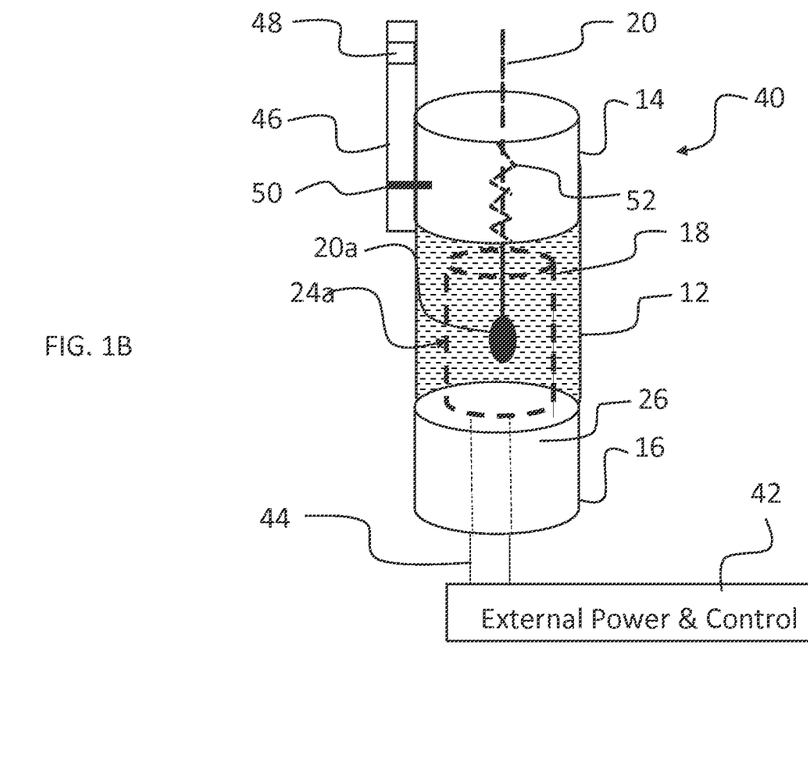
FIG. 1B is schematic diagram that shows another preferred embodiment release device of the invention.

FIG. 1B shows another preferred embodiment release device 40. The release device 40 is similar to the release device 10 of FIG. 1A, but includes a heating element 24a in the form of shaped cylindrical or partial cylindrical (e.g. taco shell shaped) sheet/strip resistive heater. In addition, no control or power included in the second end cap 16. Instead, control and power 42 are provided by an external device via external (sealed) connections 44. In this case, the release device is used within or attached to another device that supplies power to the heating element 24a at an appropriate time. FIG. 1B also illustrates a mounting bracket 46 that can secure the release, such as to the frame of a mechanical release device. The bracket 46 includes a through hole 48 for attachment to an external device and is a bolt 50 that secures the bracket 46 to the release device 40. In other embodiments, the bracket is a unitary or integral part of the housing 12 or one of first and second caps 14 and 16. FIG. 1B also shows an internal spring 52 that provides the predetermined force opposed by the material matrix 18 with its hold on the member 20 and its feature 20a. This internal spring 52 is useful, for example, with an external mechanical device that does not provide the predetermined force.

Figure 2:
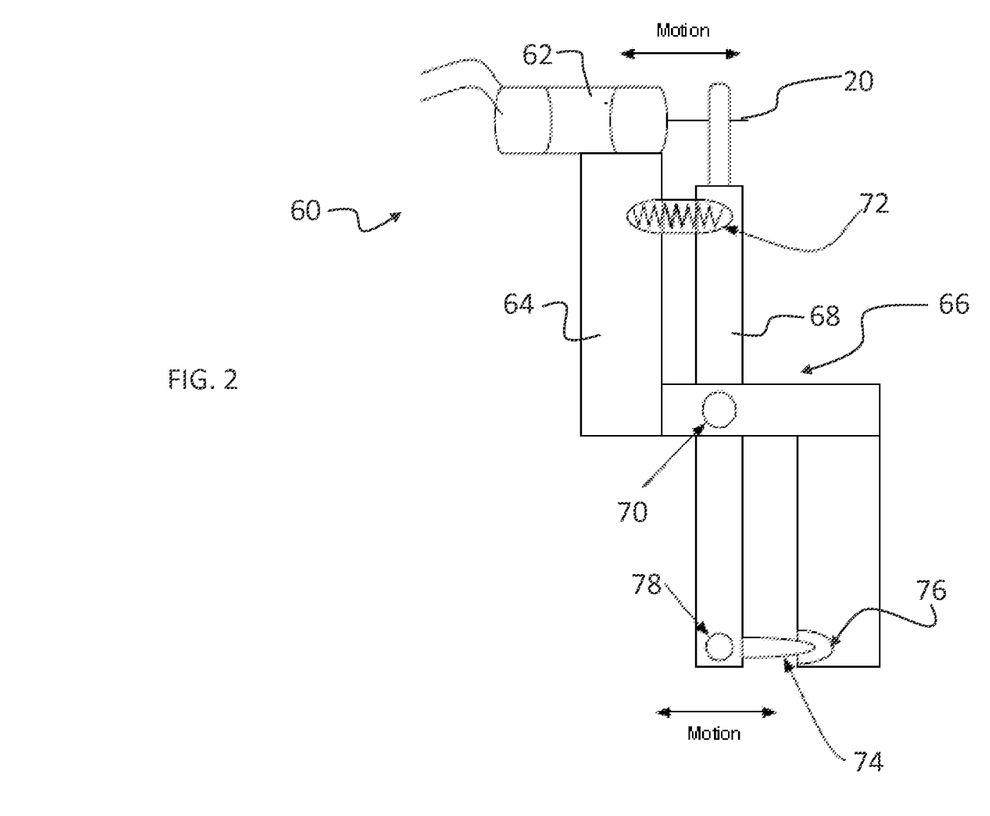
FIG. 2 is schematic diagram that shows a preferred embodiment release system of the invention.

FIG. 2 illustrates a preferred embodiment release system 60 of the invention. The release system includes a release device 62 in accordance with FIG. 1A or FIG. 1B. The release device 62 is attached to the frame 64 of a mechanical release 66. The member 20 is attached to a pivoting post 68 that pivots about a first pivot 70 (such as pin) of the frame. A spring 72 provides the predetermined force that the material matrix 18 within the release device 62 opposes. In the position of FIG. 2 (non release), a retention pin 74 interfaces in a recess 76 or hole of the frame 64 and secures an instrument (not shown). Activation of the release device 62 permits the spring 72 to move the member 20 to the right and pivot the post 68 about the first pivot 70. This moves the retention pin 74 out of the recess 76. Once free from the recess 76, the retention pin 74 can pivot about a second pivot 78 and release an instrument secured to the pin 74.

Experimental Data

Experiments were conducted with prototype devices. Artisans will appreciated advantages of the invention along with additional preferred features from the discussion of the experiments.

Figure 3:
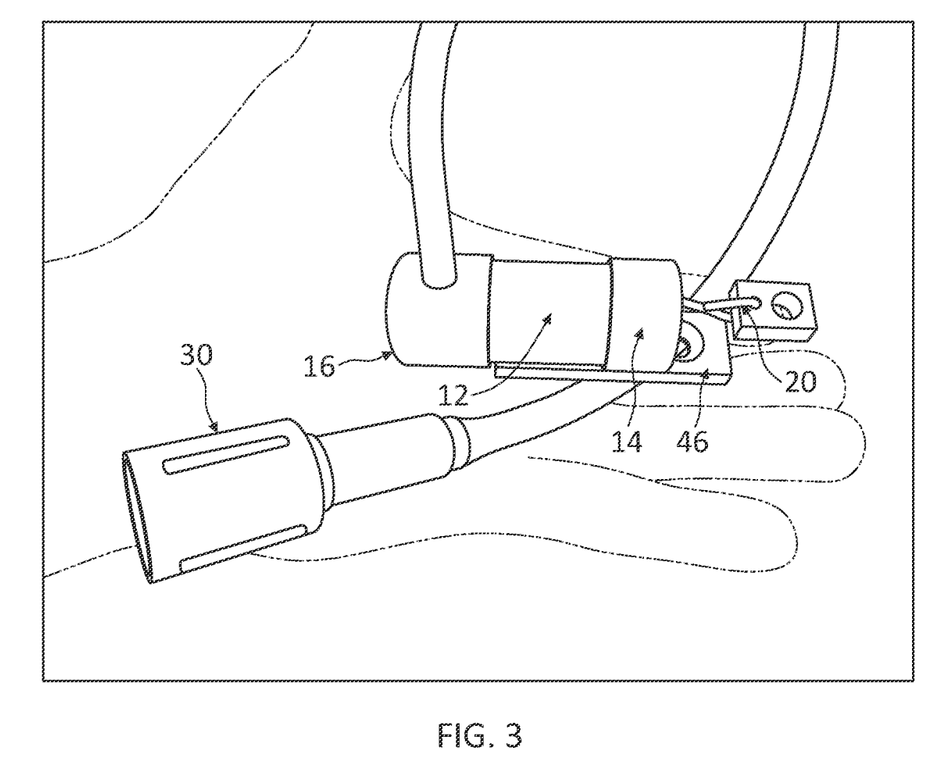
FIG. 3 is an image of a preferred experimental embodiment release device of the invention.

FIG. 3 shows an experimental prototype of the invention. The prototype is consistent with FIG. 1. The communication sensor connection 30 is an acoustic sensor cable and is labelled in FIG. 2, as are the housing 12, end caps 14 and 16, and the member 20, which has a hooked end in the prototype for connection through an eyehole of connection member of another devices. The experimental prototype was designed to release an ocean bottom seismometer (OBS) package from its anchor.

The preferred prototype device was designed to function in temperatures ranging form approximately −40° F. to 100° F., or the limits of the instrument it is paired with that do not fall outside of this range. The example prototype can be activated sonically in the same manner as the "burn wire" technology discussed in the background and the example heating element of the preferred device draws a low current and power, e.g., consistent 0.8 Amps at 12V. Traditional burn-wire release systems draw approximately 1.0 Amp at 18V, which varies based on the salinity of the electrolyte (ocean).

The preferred matrix is a polymorph, low temperature melting plastic, which was used in the experiments as a matrix to hold at least a portion of a titanium release wire within the matrix. 12V-18V DC activated heating of a silicon heat strip, which was wrapped around the polymorph matrix. The held portion of the wire, the heat strip and the matrix are inside a polycarbonate tubular housing. When heated to 139° F. the polymorph plastic softens and allows a titanium wire to slip free triggering a release.

The prototype was tested with a pressure-bomb test in a hydraulics lab under and simulated the environment equivalent to a pressure depth of approximately 1000 meters (2000 psi). The release was allowed hold the wire for a full 24-hours under pressure before activating the release voltage. After activation, the new release dropped its weight in just over 4-minutes. A post-test inspection revealed no issues and the device was quickly reset for future use.

The experiments shows that release devices of the invention can replace existing state-of-the-art burn-wire technology, and also open the field of Ocean Bottom Seismology in freshwater bodies around the world. Another application complements existing burn-wire technology, as a backup release should there be a failure in the old system, which requires an electrolytic connection with an environmentally exposed ground-pin to function In the experiments, the polymorph medium (polymorph plastic plug) is solid white and very hard at room temperature or under conditions that simulate a deep water release environment. The polymorph turns clear and soft at approximately 139° F. In experiments, a clear acrylic housing was used for observation purposes, which made it easy to see the release wire within the polymorph medium.

Experiments demonstrate that prototypes could hold 80 lbs. of static weight at room temperature (73° F.) without fail, this far exceeds a necessary predetermined force to oppose in many applications of interest, for example mechanical release device, which requires 22 pounds of spring forces. The static spring load it must hold on in this case is that provided by the mechanical release, i.e., ~22 lbs, though it is preferable to exceed the eternal predetermined force, e.g., by a percentage such as 10-40%.

In testing, the following data were achieved for Polymorph Release Bench Testing
Test 1
Acoustic unit: #33
Battery voltage: 17.9V
Water temperature: 58.5° F.
Start time: 10:13
Seconds to pin release: 120
Test 2
Acoustic unit: #33
Battery voltage: 17.8V
Water temperature: 57.5° F.
Start time: 10:47
Seconds to pin release: 119
Test 3
Acoustic unit: #33
Battery voltage: 17.7V
Water temperature: 62° F.
Start time: 09:00
Seconds to pin release: 133
Test 4
Acoustic unit: #69
Battery voltage: 17.8V
Water temperature: 63.6° F.
Start time: 11:44
Seconds to pin release: 150
Acoustic unit: #69
Battery voltage: 17.7V
Water temperature: 64° F.
Start time: 10:15
Seconds to pin release: 181
Test 5
Acoustic unit: #69
Battery voltage: 17.7V
Water temperature: 64.5° F.
Start time: 13:05
Seconds to pin release: 225
Test 6
Acoustic unit: #69
Battery voltage: 17.6V
Water temperature: 63° F.
Start time: 09:15
Seconds to pin release: 130
Prototype Part List

| PN | Description |
| --- | --- |
| 90455K36 | Titanium wire 0.080" diam (13' spool) |
| 9567K13 | 1" plastic cap (front) |
| 9753K89 | 1" soft cap (back) |
| 7945T42 | 1" × 2" silicon heat strip |
| 8585K35 | 1" OD polycarbonate tube (12" length) |
| InstaMorph | Polymorphic plastic beads (34 oz) (melted into pliable form and pressed into the housing) ScotchCast 2131 compound |
| VMG-3 FS | Impulse underwater cable (underwater cable supplied 18-24 V of 0.8 amps @ 12 V, 0.4 amps @ 24 V) |

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A release device for releasing another device in an environment, the release device comprising:
a housing containing a material matrix therein;
a member restrained by the material matrix and extending from the material matrix to outside the housing, said material matrix comprising a solid in conditions of the environment to hold the member stationary in opposition to predetermined force and soften at a predetermined softening temperature to permit relative movement between the member and the material matrix;

a heating element disposed to heat the material matrix to the predetermined softening temperature; and a cap sealed to said housing, said cap containing a power source for powering said heating element and a controller for controlling said heating element and communications via a remote communication sensor.

2. The release device of claim 1, wherein the material matrix comprises a polymorph material.

3. The release device of claim 1, wherein the power source comprises a battery.

4. The release device of claim 1, wherein said heating element comprises a silicon heat strip.

5. The release device of claim 1, wherein said communication sensor comprises a sonar sensor.

6. The release device of claim 1, wherein the material matrix comprises a re-usable matrix that reforms into a solid after being heated beyond the predetermined softening temperature and allowed to cool back below the predetermined softening temperature.

7. The release device of claim 1, and wherein said cap comprises a spring that applies the predetermined force to said member.

8. The release device of claim 1, wherein said heating element comprises a resistive heating element.

9. The release device of claim 1, wherein said heating element comprises a chemical heating element.

10. A release system comprising:
a release device mounted to a mechanical release device, wherein the release device comprises
a housing containing a material matrix therein;
a restrained member restrained by the material matrix and extending from the material matrix to outside the housing, said material matrix comprising a solid in conditions of the environment to hold the member stationary in opposition to predetermined force and soften at a predetermined softening temperature to permit relative movement between the member and the material matrix; and a heating element disposed to heat the material matrix to the predetermined softening temperature; wherein the mechanical release device comprises a spring that provides the predetermined force to a pivot member that is attached to said restrained member.

11. The release system of claim 10, further comprising a cap sealed to said housing, said cap containing a power source for powering said heating element and a controller for controlling said heating element and communications via a remote communication sensor.

12. A method for releasing an underwater device in response to a remote communication received through water in which the underwater device is submersed, the method comprising:
attaching the underwater device to a member extending out of a release device;
submersing the release device while the underwater devices is attached to the member;
holding a portion of the member with a material matrix of the release device within a housing of the release device while the release device and the underwater device are submersed to prevent release of the underwater device against an opposing force associated with the underwater device;
receiving, by the release device, a remote communication through the water;
heating the material matrix in response to the remote communication to heat the matrix to a softening temperature and permit movement of the member to fully release the underwater device.

* * * * *